(12) United States Patent
Tidd

(10) Patent No.: US 7,456,359 B1
(45) Date of Patent: Nov. 25, 2008

(54) OUTLET COVER SYSTEM

(76) Inventor: Roger M. Tidd, 1142 N. Elm St., Fargo, ND (US) 58102

( * ) Notice: Subject to any disclaimer, the term of this patent is extended or adjusted under 35 U.S.C. 154(b) by 0 days.

(21) Appl. No.: 11/749,772

(22) Filed: May 17, 2007

(51) Int. Cl.
*H02G 3/14* (2006.01)
(52) U.S. Cl. .................... 174/66; 174/67; 220/241; 312/328; D8/353; D17/177; 439/652
(58) Field of Classification Search ............ 174/66, 174/67; 220/241, 242; 312/328; D8/353; D13/177; 439/652, 136, 143–147
See application file for complete search history.

(56) References Cited

U.S. PATENT DOCUMENTS

| | | | |
|---|---|---|---|
| 5,094,630 A * | 3/1992 | Jammet | 439/652 |
| 5,285,014 A | 2/1994 | Gilchrist | |
| 5,375,728 A | 12/1994 | West | |
| 5,526,952 A | 6/1996 | Green | |
| 5,723,816 A | 3/1998 | Neece | |
| 6,045,374 A * | 4/2000 | Candeloro | 439/105 |
| D425,768 S | 5/2000 | Staley | |
| 6,103,974 A | 8/2000 | Erdfarb | |
| 6,653,566 B2 | 11/2003 | Petak et al. | |
| 6,664,471 B1 | 12/2003 | Howe, Jr. | |
| 6,703,562 B1 | 3/2004 | Pacheco | |
| 6,897,381 B2 * | 5/2005 | He et al. | 174/67 |
| D510,256 S | 10/2005 | Genelle | |

OTHER PUBLICATIONS

Crane-covers, Crane-Covers, website <available at http://www.cranecovers.net/>, Website can be changed.

\* cited by examiner

*Primary Examiner*—Dhiru R Patel

(57) ABSTRACT

An outlet cover system for efficiently covering an electrical outlet. The outlet cover system generally includes a cover including a front portion, wherein the front portion includes an inner surface and an outer surface opposite the inner surface and at least one post including an inner end and an outer end opposite the inner end, wherein the post extends from the inner surface of the front portion. The post is nonconductive and removably positionable within a ground contact of an outlet.

18 Claims, 5 Drawing Sheets

OUTLET COVER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to electrical outlets and more specifically it relates to an outlet cover system for efficiently covering an electrical outlet.

2. Description of the Related Art

Any discussion of the prior art throughout the specification should in no way be considered as an admission that such prior art is widely known or forms part of common general knowledge in the field.

Electrical outlets (i.e. receptacles, sockets) are generally located among various positions on a given wall in a room. In addition, many rooms generally have a plurality of electrical outlets because of the plurality of electrical appliances (i.e. television, computer, lamps, etc.) that many people utilize in their day-to-day lives. The electrical outlets commonly used in a home provide a transfer point so that AC electric power can flow to the electrical appliances.

When painting, wallpapering and/or cleaning walls of a room it is generally necessary to cover the electrical outlet to prevent paint and wallpaper from overlapping the electrical outlet and from entering within the contacts of the electrical outlet. A common method of covering the electrical outlet is by utilizing tape and taping over and around the edges of the electrical outlet.

This can be a tedious process and it may also be difficult to accurately attach the tape around the electrical outlet. Because of the general lack of efficiency and practicality in the prior art there is the need for a new and improved outlet cover system for efficiently covering an electrical outlet.

BRIEF SUMMARY OF THE INVENTION

The general purpose of the present invention is to provide an outlet cover system that has many of the advantages of the electrical outlets mentioned heretofore. The invention generally relates to an electrical outlet which includes a cover including a front portion, wherein the front portion includes an inner surface and an outer surface opposite the inner surface and at least one post including an inner end and an outer end opposite the inner end, wherein the post extends from the inner surface of the front portion. The post is nonconductive and removably positionable within a ground contact of an outlet.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide an outlet cover system for efficiently covering an electrical outlet.

Another object is to provide an outlet cover system that easily attaches and detaches to an outlet.

An additional object is to provide an outlet cover system that does not require any external hardware (i.e. screws, etc.).

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
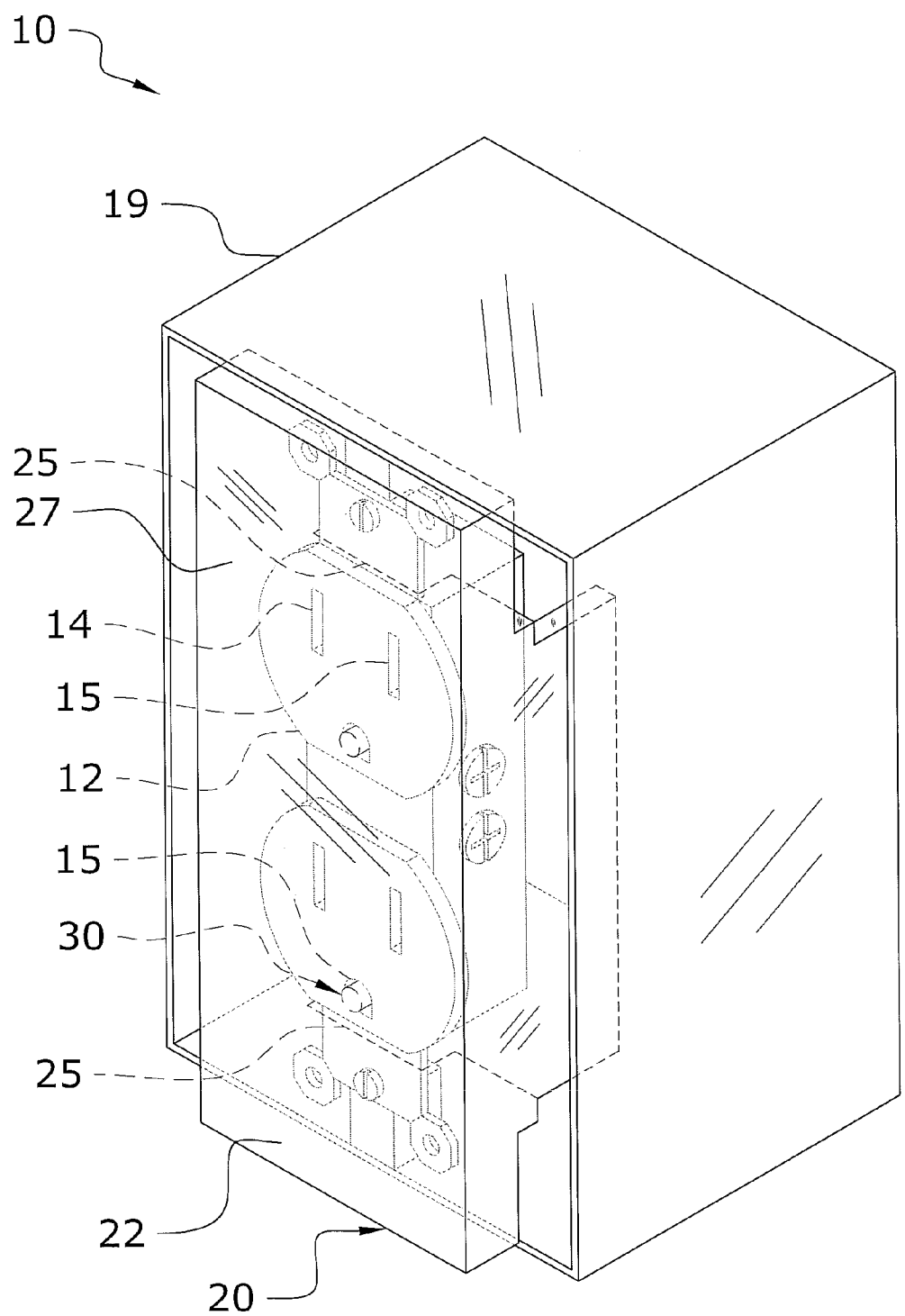
FIG. 1 is a front upper perspective view of the present invention in use.

Turning now descriptively to the drawings, in which similar reference characters denote similar elements throughout the several views, FIGS. 1 through 5 illustrate an outlet cover system 10, which comprises a cover 20 including a front portion 21, wherein the front portion 21 includes an inner surface 26 and an outer surface 27 opposite the inner surface 26 and at least one post 30 including an inner end 32 and an outer end 34 opposite the inner end 32, wherein the post 30 extends from the inner surface 26 of the front portion 21. The post 30 is nonconductive and removably positionable within a ground contact 16 of an outlet 12.

B. Outlet

Figure 2:
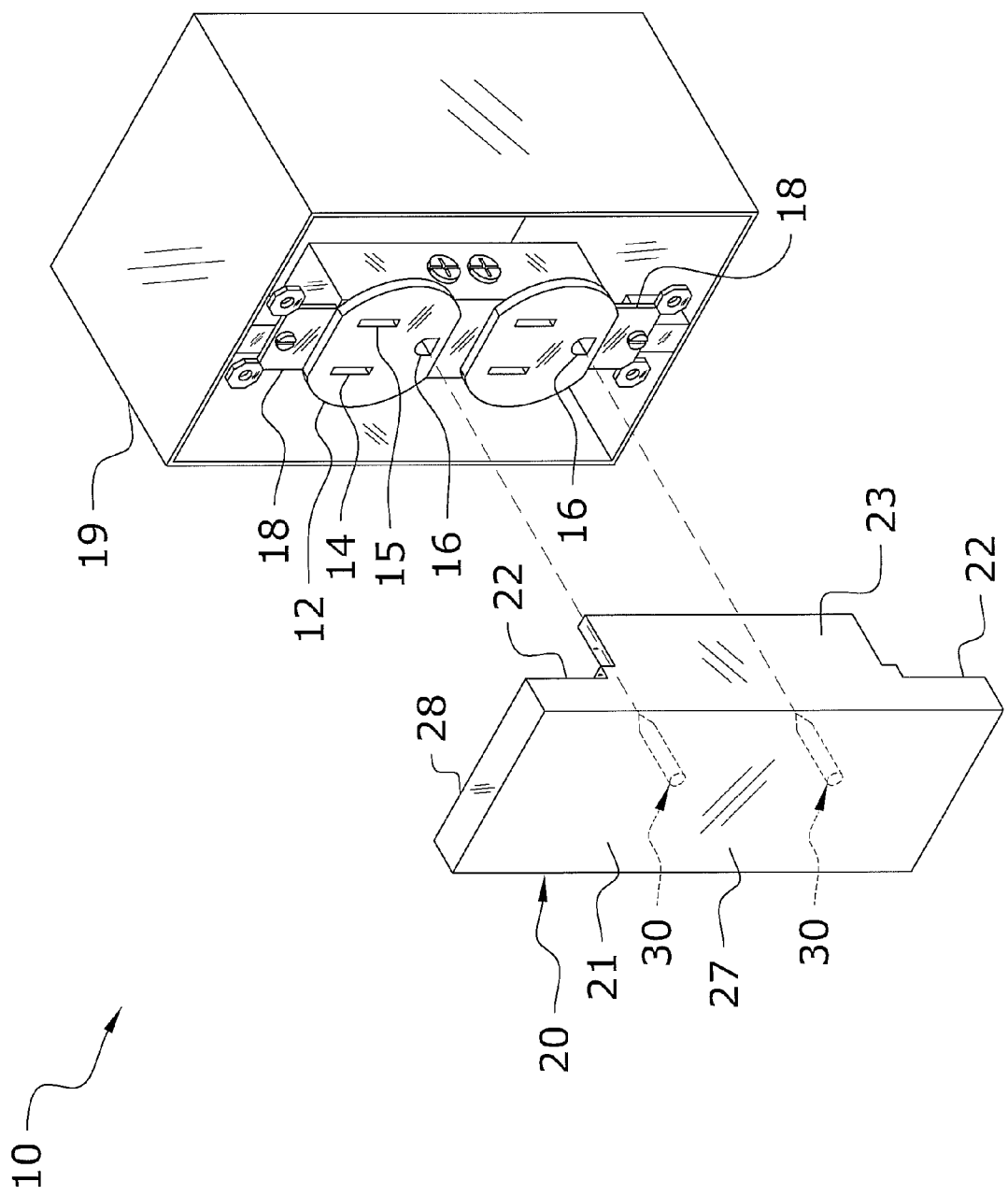
FIG. 2 is a front upper perspective view of the present invention exploded from an outlet.

The outlet 12 is preferably comprised of a standard electrical outlet 12. The outlet 12 preferably includes a live contact 14, neutral contact 15 and a ground contact 16 as illustrated in FIGS. 1 and 2. In the preferred embodiment of the present invention the posts 30 preferably extend within the ground contact 16 of the outlet 12. In certain circumstances, it is appreciated that the outlet 12 may only include a live contact 14 and a neutral contact 15, wherein the posts 30 of the present invention would preferably extend within the neutral contact 15. It is also appreciated that the present invention may be configured to attach to a dual outlet 12 configuration (i.e. standard wall outlet 12, etc.) or a single outlet 12 configuration (i.e. clothes dryer outlet 12, etc.).

The outlet 12 is also preferably attached to a housing 19 via an attachment structure 18 and further substantially extends with the housing 19 as illustrated in FIGS. 1 and 2. The attachment structure 18 extends outwardly from opposing ends of the outlets 12 and removably attaches to the housing 19 via various fasteners (i.e. screws, bolts, etc.). The housing 19 is preferably comprised of a standard housing common in the art of electrical outlets 12 and as illustrated in FIGS. 1 and 2.

C. Cover

The cover 20 protects the outlet 12 and attachment structure 18 from various elements (i.e. paint, cleaning liquids, etc.) while performing various maintenance chores (i.e. painting, wallpapering, cleaning, etc.) upon a wall. The cover 20 may be comprised of various materials, such as but not limited to plastic. The cover 20 is also preferably transparent so as to efficiently view the outlet 12 and ground contact 16 through the cover 20 while attaching the cover 20 to the outlet 12. The cover 20 is also preferably substantially similar in configuration and size as the front plate of the outlet 12 so that an individual may efficiently trim wallpaper around the outer edges of the cover 20.

Figure 5:
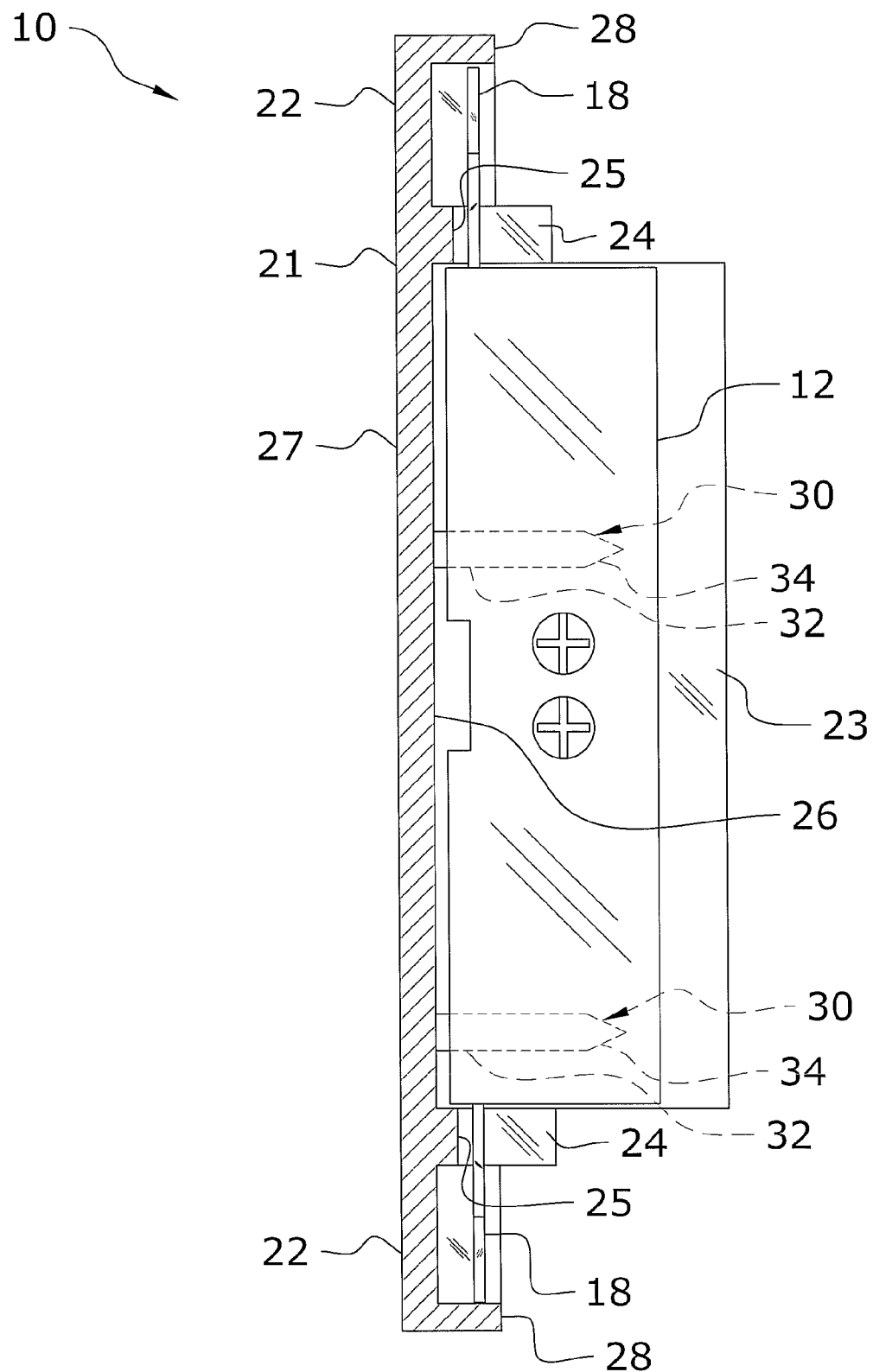
FIG. 5 is a cross-sectional view of the present invention attached to an outlet.

The cover 20 may be comprised of various configurations (i.e. square, circular, etc.) all which efficiently surround the outer edges of the outlet 12 and the attachment structure 18 as illustrated in FIGS. 1 and 2. The cover 20 includes a front portion 21 as illustrated in FIGS. 1 and 2. The front portion 21 covers 20 the front surface of the outlet 12 as illustrated in FIGS. 1 and 5. The front portion 21 also includes an inner surface 26 and an outer surface 27.

The outer perimeter of the front portion 21 extends around the outer edges of the outlet 12 or the pair of outlets 12. The outer perimeter as described includes a pair of perimeter ends and a pair of perimeter sides. The extended portions 22 extend from opposing perimeter ends of the front portion 21 as illustrated in FIGS. 1 through 5. The extended portions 22 also substantially extend over the attachment structure 18 so as to protect the attachment structure 18 from the various elements (i.e. paint, cleaning liquids, wallpaper, etc.).

The extended portions 22 are preferably substantially coplanar with the front portion 21. The extended portions 22 and the front portion 21 are preferably comprised of an integrally formed structure; however it is appreciated that the extended portions 22 and the front portion 21 may be comprised of separate structures. The extended portions 22 also preferably include an outer lip 28 extending across the extended portion 22. The outer lip 28 helps to further prevent foreign material (i.e. paint, etc.) from engaging the outlet 12.

Figure 3:
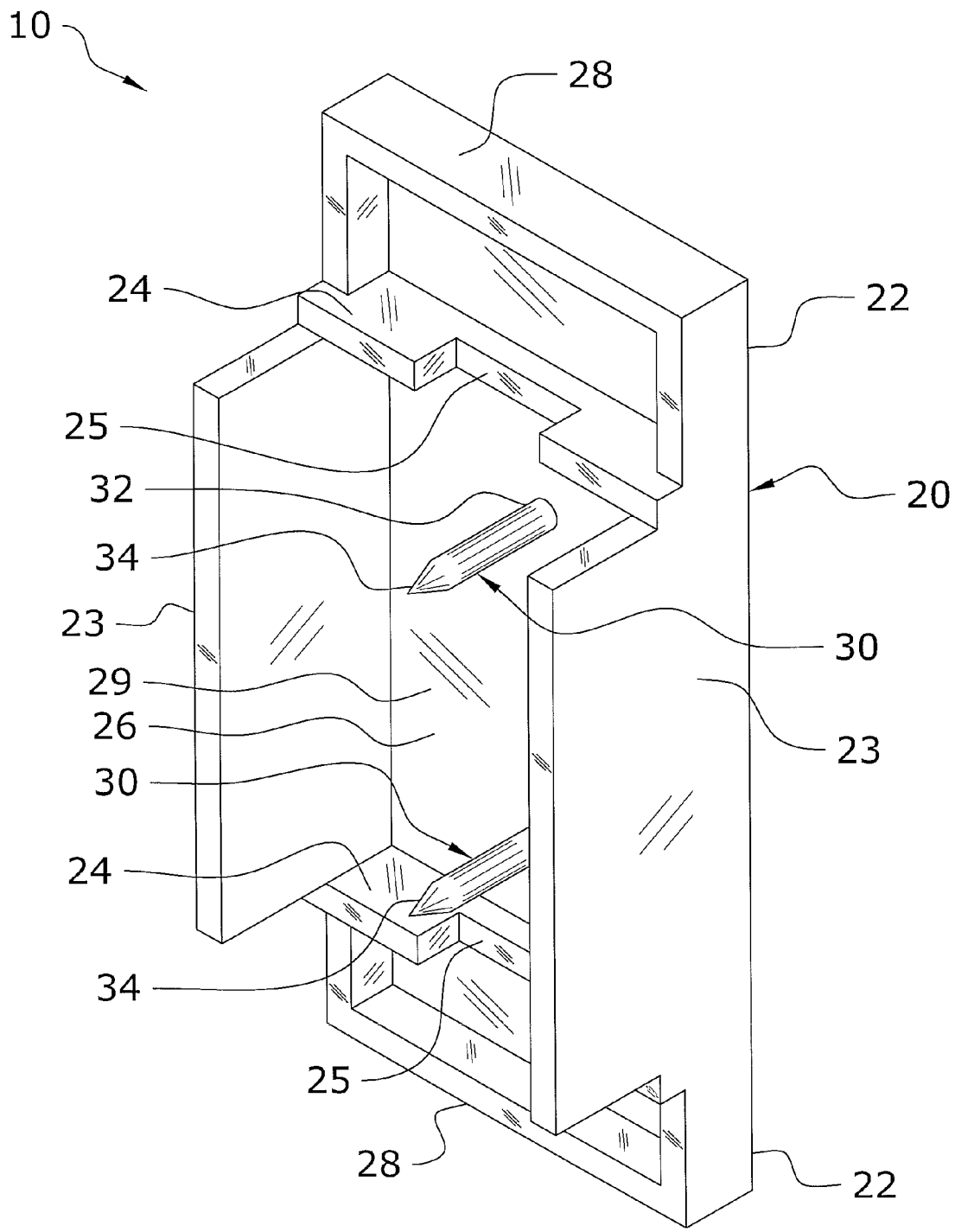
FIG. 3 is a rear upper perspective of the present invention.

A pair of side portions 23 extend from opposing perimeter sides of the front portion 21 as illustrated in FIGS. 1 through 3. The side portions 23 also substantially extend over the sides of the outlets 12 and within the housing 19 so as to protect the outlets 12 from the various elements (i.e. paint, cleaning liquids, wallpaper, etc.). The side portions 23 also preferably extend between the extended portions 22 of the cover 20 as illustrated in FIGS. 2 and 3.

The side portions 23 are preferably substantially perpendicular with the front portion 21. The side portions 23 and the front portion 21 are preferably comprised of an integrally formed structure; however it is appreciated that the side portions 23 and the front portion 21 may be comprised of separate structures. The side portions 23 extend over the sides of the outlet 12 and the side screws attached to the outlet 12 as illustrated in FIGS. 1 and 5.

Figure 4:
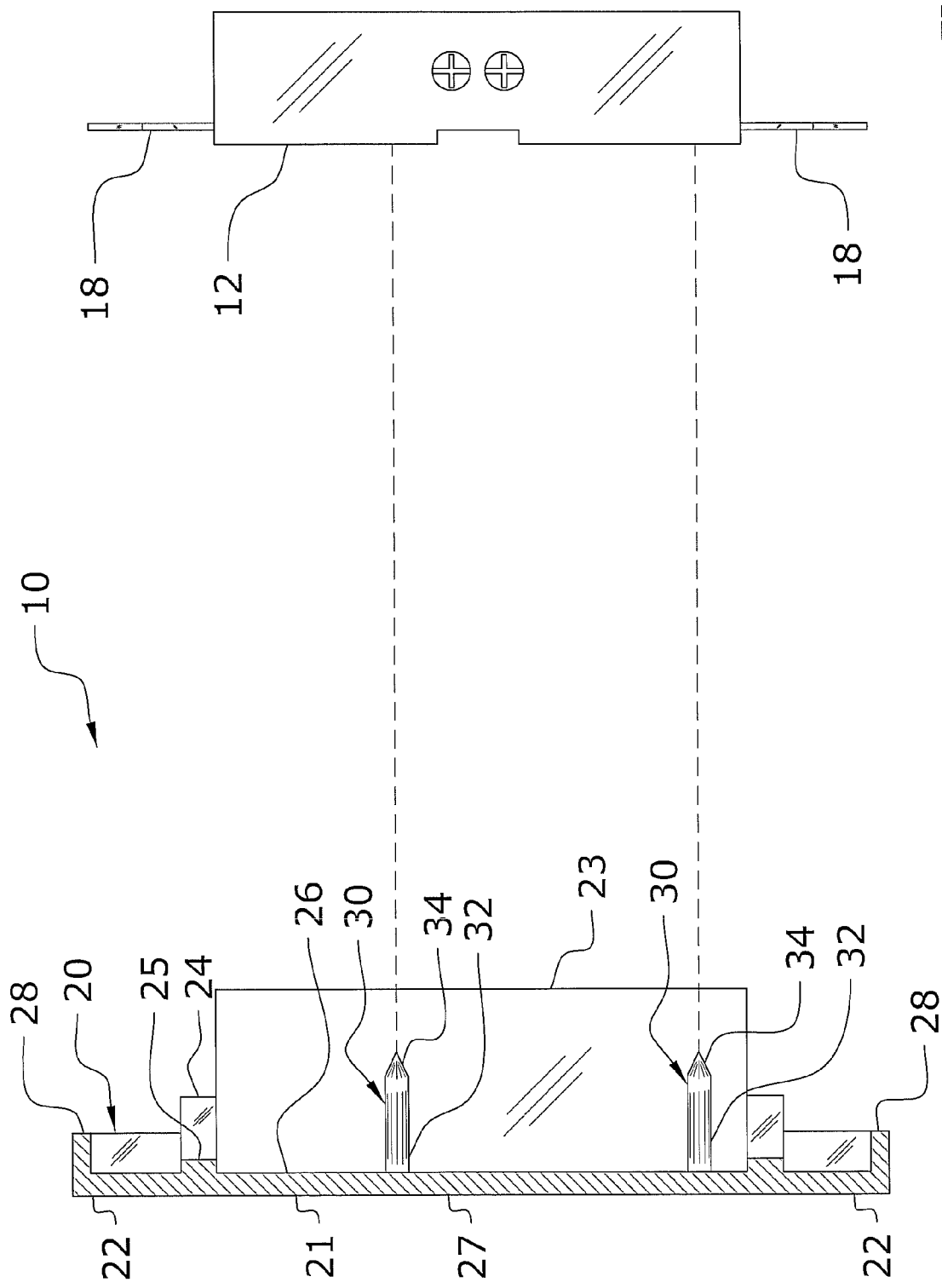
FIG. 4 is a cross-sectional view of the present invention exploded from an outlet.

A pair of end portions 24 extend from an inner surface 26 of the front portion 21 adjacent opposing perimeter ends as illustrated in FIGS. 3 through 5. The end portions 24 also substantially extend over the ends of the outlets 12 and within the housing 19 so as to protect the outlets 12 from the various elements (i.e. paint, cleaning liquids, wallpaper, etc.). The end portions 24 also preferably extend between the side portions 23 of the cover 20.

The end portions 24 also preferably extend between the extended portion 22 and the front portion 21. The end portions 24 each preferably include a recessed portion 25 extending within each of the end portions 24. The recessed portion 25 receives the attachment structure 18. The recessed portions 25 may be comprised of various configurations, such as rectangular or semi-circular, all which efficiently receive the attachment structure 18.

The end portions 24 are preferably substantially perpendicular with the front portion 21. The end portions 24 and the front portion 21 are preferably comprised of an integrally formed structure; however it is appreciated that the end portions 24 and the front portion 21 may be comprised of separate structures. The cover 20 also includes a cavity 29 extending between the end portions 24 and the side portions 23. The cavity 29 preferably receives a substantial portion of the outlet 12.

D. Posts

The present invention includes at least one post 30 to efficiently extend within the ground contact 16 of the outlet 12 and secure the present invention to the outlet 12. In the preferred embodiment the present invention includes a pair of posts 30 to extend within the ground contacts 16 of a dual outlet 12 configuration as illustrated in FIGS. 1 through 5. It is appreciated however that the number of posts 30 included with the present invention preferably equals the number of outlets 12.

The posts 30 are comprised of a nonconductive material. The posts 30 are also preferably comprised of a tubular configuration or a configuration wherein the cross-section of the post 30 is substantially similar to the cross-section of the ground contact 16. The posts 30 are also preferably comprised of an elongated configuration similar in length to a length of a ground plug commonly plugged within a ground contact 16 of an outlet 12. The posts 30 include an inner end 32 and an outer end 34 as illustrated in FIGS. 3 through 5.

The post 30 also extends outwardly from the inner surface 26 of the front portion 21, wherein the inner end 32 extends from the inner surface 26. The outer end 34 is distally spaced from the inner end 32, wherein the outer end 34 extends within the ground contact 16. The outer end 34 is preferably comprised of a pointed end to efficiently be received within the ground contact 16.

E. In Use

In use, the front plate is first removed from the outlet 12. The present invention is now aligned with the outlet 12, wherein the side portions 23 are aligned with the sides of the outlet 12 and the extended portions 22 are aligned over the attachment structure 18. The posts 30 are now extended within the ground contacts 16 of the outlet 12 until the inner surface 26 of the front portion 21 substantially engages the front surface of the outlet 12 or the posts 30 are fully extended within the ground contacts 16. The present invention is now attached upon the outlet 12. When the outlet 12 is no longer desired to be masked by the present invention the previous process is simply reversed to remove the present invention from the outlet 12.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. An outlet cover system, comprising:
   a cover including a front portion, wherein said front portion includes an inner surface and an outer surface opposite said inner surface;
   at least one post including an inner end and an outer end opposite said inner end, wherein said at least one post extends from said inner surface of said front portion and wherein said at least one post is nonconductive;
   wherein said at least one post is removably positionable within a ground contact of an outlet; wherein said cover includes a pair of side portions extending between a pair of extended portions of said front portion and parallel to a longitudinal axis of said cover.

2. The outlet cover system of claim 1, wherein said cover includes said pair of extended portions extending from opposing ends of said front portion.

3. The outlet cover system of claim 2, wherein said pair of extended portions are parallel to said front portion.

4. The outlet cover system of claim 2, wherein said pair of extended portions are coplanar to said front portion.

5. The outlet cover system of claim 1, wherein said at least one post is perpendicular to said front portion.

6. The outlet cover system of claim 1, wherein said outer end of said at least one post is comprised of a pointed configuration.

7. The outlet cover system of claim 1, wherein said at least one post extends from a central longitudinal axis of said front portion.

8. The outlet cover system of claim 1, wherein said at least one post includes a pair of posts.

9. The outlet cover system of claim 1, wherein said pair of side portions are perpendicular to said front portion.

10. The outlet cover system of claim 1, wherein said cover includes a pair of end portions extending from said inner surface of said front portion adjacent opposing ends of said front portion and across a longitudinal axis of said cover.

11. The outlet cover system of claim 10, wherein said pair of end portions are perpendicular to said front portion.

12. The outlet cover system of claim 11, wherein said pair of end portions each include a recessed portion extending within said pair of end portions.

13. The outlet cover system of claim 1, wherein said cover includes a cavity extending between said pair of side portions and a pair of end portions.

14. An outlet cover system, comprising:
   a cover including a front portion, wherein said front portion includes an inner surface and an outer surface opposite said inner surface;
   wherein said front portion includes an outer perimeter and wherein said outer perimeter includes a pair of perimeter ends and a pair of perimeter sides;
   wherein said cover includes a pair of extended portions extending from said pair of perimeter ends;
   wherein said cover includes a pair of side portions extending between said pair of extended portions; and
   at least one post including an inner end and an outer end opposite said inner end, wherein said at least one post extends from said inner surface of said front portion and wherein said at least one post is nonconductive;
   wherein said at least one post is removably positionable within a ground contact of an outlet.

15. The outlet cover system of claim 14, wherein said pair of extended portions are coplanar to said front portion.

16. The outlet cover system of claim 14, wherein said pair of side portions are perpendicular to said front portion.

17. The outlet cover system of claim 14, wherein said cover includes a pair of end portions perpendicularly extending from said inner surface of said front portion adjacent opposing ends of said front portion.

18. An outlet cover system, comprising:
   a cover including a front portion, wherein said front portion includes an inner surface and an outer surface opposite said inner surface;
   wherein said front portion includes an outer perimeter and wherein said outer perimeter includes a pair of perimeter ends and a pair of perimeter sides;
   wherein said cover includes a pair of extended portions extending from said pair of perimeter ends;
   wherein said cover includes a pair of side portions extending between said pair of extended portions; and
   at least one post including an inner end and an outer end opposite said inner end, wherein said at least one post extends from said inner surface of said front portion and wherein said at least one post is nonconductive;
   wherein said at least one post is removably positionable within a ground contact of an outlet;
   wherein said pair of extended portions are coplanar to said front portion;
   wherein said at least one post is perpendicular to said front portion and wherein said outer end is comprised of a pointed configuration;
   wherein said at least one post extends from a central longitudinal axis of said front portion;
   wherein said pair of side portions are perpendicular to said front portion;
   wherein said cover includes a pair of end portions extending from said inner surface of said front portion adjacent said perimeter ends of said front portion;
   wherein said pair of end portions are perpendicular to said front portion;
   wherein said pair of end portions each include a recessed portion extending within said pair of end portions;
   wherein said pair of side portions extend between said pair of extended portions;
   wherein said pair of end portions extend between said pair of side portions;
   wherein said cover includes a cavity extending between said pair of side portions and said pair of end portions.

* * * * *